3,428,422
PREPARATION OF PHOSPHORYL FLUORIDE AND DIFLUOROPHOSPHORIC ACID
Robert A. Wiesboeck, Atlanta, Ga., assignor, by mesne assignments, to USS Agri-Chemicals, Inc., Pittsburgh, Pa., a corporation of Delaware
No Drawing. Filed Nov. 14, 1967, Ser. No. 682,971
U.S. Cl. 23—139                 8 Claims
Int. Cl. C01b 25/10, 25/16, 33/08

ABSTRACT OF THE DISCLOSURE

Phosphoryl fluoride and difluorophosphoric acid are prepared directly from fluorosulfonic acid and a phosphate source, such as phosphate rock, phosphoric acid, a metal orthophosphate or metal polyphosphate, by heating the mixture at a temperature of about 150–400° C. and recovering the vapors as product. The evolved phosphoryl fluoride and difluorophosphoric acid may be recovered separately by the use of cold traps or other means.

BACKGROUND AND SUMMARY

Conventional methods for the manufacture of phosphoryl fluoride are based on halogen transfer reactions of phosphoryl chloride with hydrogen fluoride or a fluoride salt. Another method consists of heating phosphorus pentoxide with calcium fluoride to 500–1000° C. Fluorophosphoric acids, on the other hand, are produced by reacting phosphorus pentoxide with hydrogen fluoride. All of the foregoing fluorophosphorus compounds are derived from phosphorus pentoxide which is accessible only through the electric furnace method.

I have discovered that phosphoryl fluoride and difluorophosphoric acid can be produced from phosphorus-containing sources, such as phosphate rock, phosphoric acid, a metal orthophosphate or a metal polyphosphate through the use of fluorosulfonic acid in a simple one-step operation. In the process, the phosphorus-bearing source is mixed with fluorosulfonic acid and the mixture heated to about 150–400° C. and the evolved vapors of phosphoryl fluoride and difluorophosphoric acid may be recovered while at the same time sulfuric acid is recovered as a by-product.

DETAILED DESCRIPTION

Phosphoryl fluoride ($POF_3$) and difluorophosphoric acid ($HPO_2F_2$) can be prepared directly from phosphate rock and fluorosulfonic acid. Other phosphate sources such as iron and aluminum phosphates or condensed species such as pyro- and other polyphosphates can also be used in place of phosphate rock.

The reaction may be carried out in a suitable apparatus as, for example, a pressure reactor. If desired, fluorosulfonic acid vapors may be passed through a hot bed of pulverized phosphate rock or metal phosphate and the volatile product collected in a series of cold traps or other means.

The basic reaction principle can be expressed by the following equation:

$$6HSO_3F + Ca_3(PO_4)_2 \rightarrow 2POF_3 + 3CaSO_4 + 3H_2SO_4$$

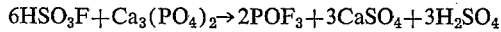

Difluorophosphoric acid represents the hydrolysis product of phosphoryl fluoride:

$$POF_3 + H_2O \rightarrow HPO_2F_2 + HF$$

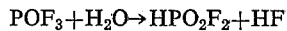

Accordingly, the amount of difluorophosphoric acid formed is dependent on the moisture and hydroxyl content of the phosphate source.

Employing phosphate rock of 1.0–1.5% moisture content, the volatile P-material consists of approximately 5 parts $POF_3$ and 1 part $HPO_2F_2$.

In the practice of my process, it is merely necessary to heat a mixture of the phosphate source and fluorosulfonic acid to 150–400° C., preferably 350° C., to produce phosphoryl fluoride and difluorophosphoric acid. Sulfuric acid, which has a boiling point of 330° C. may be recovered as a by-product by heating the mixture to 400° C. The preferred procedure is to pass the vapor of fluorosulfonic acid through a hot bed of the phosphate source and collect the volatile product by fractionated condensation. The reaction begins at 150° C.; however, it is advantageous to maintain the entire reactor at 350° C. and, if desired, through 400° C. in order to remove the sulfuric acid.

The reactant ratio is not critical; however, it is desirable to use a 20–30% excess of the phosphate in order to avoid the presence of unreacted fluorosulfonic acid in the product.

Employing phosphate rock containing 34.7% $P_2O_5$, a ratio of 2 parts rock to 3 parts fluorosulfonic acid corresponds to stoichiometric proportions. Silica in the rock is converted to $SiF_4$ and the reactant ratio has to be adjusted accordingly. The stoichiometric requirement of fluorosulfonic acid to silica is 6.7:1.

The volatile product is passed through a series of traps maintained at 100, −20, −100 and −196° C., whereby by-product sulfuric acid, difluorophosphoric acid, phosphoryl fluoride and silicon tetrafluoride are obtained in the given order.

When phosphoric acid is the phosphate source reacted with fluorosulfonic acid, the following equation represents the reaction with 100% $H_3PO_4$:

$$H_3PO_4 + 2HSO_3F \rightarrow HPO_2F_2 + 2H_2SO_4$$

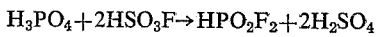

Ranges of phosphoric acids from 50% $P_2O_5$ up to and including $P_2O_5$ itself are preferred.

Specific examples illustrative of the invention may be set out as follows:

EXAMPLE I

A 20.1-g. sample of pulverized phosphate rock was placed on a screen in a vertical aluminum pipe and heated to 350° C. The phosphate rock had the following composition: 34.7% $P_2O_5$, 47.5% CaO, 5.57% $SiO_2$, 3.51% F, 1.36% $Fe_2O_3$, 0.70% $Al_2O_3$. Fluorosulfonic acid vapor was introduced through the bottom inlet of the reactor pipe from an acid reservoir which was maintained at 200° C.

The off-gas was passed through a series of traps maintained at 100, −20, −100 and −196° C., collecting sulfuric acid, difluorophosphoric acid, phosphoryl fluoride and silicon tetrafluoride in the given order. The reaction was terminated after approximately 20 g. of fluorosulfonic acid vapor had been passed into the reactor and a slow sweep of nitrogen was applied to move all volatile product into the trapping system. A total of 0.9 g. of difluorophosphoric acid and 4.5 g. of phosphoryl fluoride was obtained.

EXAMPLE II

Reacting 12.2 g. of aluminum phosphate and 25.0 g. of fluorosulfonic acid as described in Example I produced 7.3 g. of phosphoryl fluoride.

EXAMPLE III

Chemically pure calcium metaphosphate (19.8 g.) was heated together with 60.0 g. of fluorosulfonic acid in an autoclave to 200° C. The reaction was completed within one hour as indicated by pressure constants. The temperature was then reduced to 150° C. and volatile material was expanded into an evacuated steel cylinder. The collected product consisted of 12.9 g. of phosphoryl fluoride and a small amount of fluorosulfonic acid which was removed by fractionation through a 0° C. trap.

EXAMPLE IV

A 25.0-g. batch of calcium pyrophosphate and 60.0 g. of fluorosulfonic acid was reacted as described in Example III. The produced volatile material contained 11.2 g. of phosphoryl fluoride.

While in the foregoing specification I have set forth specific procedure in considerable detail for the purpose of illustrating embodiments of the invention, it will be understood that such details may be varied widely by those skilled in the art without departing from the spirit of my invention.

I claim:

1. In a process for preparing phosphoryl fluoride from a phosphate source selected from the group consisting of phosphate rock, phosphoric acid, and metal orthophosphates and polyphosphates selected from the group consisting of iron and aluminum, ortho and polyphosphates, the steps of heating said phosphate suorce to about 150–400° C. in contact with fluorosulfonic acid to evolve phosphoryl fluoride vapors, and collecting and recovering said vapors.

2. The process of claim 1 in which said source contains moisture and difluorophosphoric acid also is evolved and the vapors thereof collected.

3. The process of claim 1 in which the phosphate source is used in an excess of about 20–30%.

4. The process of claim 1 in which a phosphate source is maintained as a hot bed and fluorosulfonic acid vapors are passed through the bed to produce the volatile product.

5. In a process for preparing phosphoryl fluoride and difluorophosphoric acid from phosphate rock, the steps of heating phosphate rock to form a hot bed having a temperature of about 150–400° C. and passing through the bed fluorosulfonic acid vapors to evolve phosphoryl fluoride and difluorophosphoric acid vapors, and collecting and recovering said vapors.

6. The process of claim 5 in which sulfuric acid vapors are also evolved and the sulfuric acid vapors condensed at a temperature of about 100° C.

7. The process of claim 5 in which said bed of phosphate rock is maintained at a temperature of about 350° C.

8. The process of claim 1 in which phosphate rock is the phosphate source and the evolved vapors, which contain sulfuric acid, difluorophosphoric acid and silicon tetrafluoride in addition to phosphoryl fluoride, are recovered by passage through cold traps maintained at 100, −20, −100 and −196° C.

References Cited

UNITED STATES PATENTS

| 2,408,785 | 10/1946 | Lange | 23—139 |
| 2,423,895 | 7/1947 | Lange et al. | 23—139 |
| 2,488,298 | 11/1949 | Lange et al. | 23—139 |
| 2,570,924 | 10/1951 | Dupont | 23—203 |
| 2,712,494 | 7/1955 | Dupont | 23—203 |

OTHER REFERENCES

Berak, "Chemical Abstracts," vol. 57, November 1962. pp. 11910–11911.

Hayek et al., "Chemical Abstracts," vol. 50, 1956, p. 3133.

Lange et al., "Chemical Abstracts," vol. 41, 1947, p. 4397,

OSCAR R. VERTIZ, *Primary Examiner.*

HERBERT T. CARTER, *Assistant Examiner.*

U.S. Cl. X.R.

23—203, 205, 167, 172